(12) United States Patent
Ido et al.

(10) Patent No.: US 8,408,967 B2
(45) Date of Patent: Apr. 2, 2013

(54) MACHINE TOOL WITH REST APPARATUS AND MACHINING METHOD THEREOF

(75) Inventors: Masahiro Ido, Kariya (JP); Yoshihiro Somyo, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 713 days.

(21) Appl. No.: 12/558,000

(22) Filed: Sep. 11, 2009

(65) Prior Publication Data

US 2010/0068978 A1 Mar. 18, 2010

(30) Foreign Application Priority Data

Sep. 12, 2008 (JP) ................................ 2008-235540
Sep. 12, 2008 (JP) ................................ 2008-235544

(51) Int. Cl.
*B24B 49/00* (2012.01)
(52) U.S. Cl. ............................ 451/11; 451/181; 451/408
(58) Field of Classification Search .................... 451/11, 451/49, 62, 179, 181, 408
See application file for complete search history.

(56) References Cited

U.S. PATENT DOCUMENTS

| | | | | | |
|---|---|---|---|---|---|
| RE23,991 | E | * | 5/1955 | Balsiger et al. | 451/249 |
| 2,809,472 | A | * | 10/1957 | Happel | 451/246 |
| 3,690,070 | A | * | 9/1972 | Ohta | 451/249 |
| 5,237,780 | A | | 8/1993 | Lessway | |
| 5,355,633 | A | * | 10/1994 | Ishikawa et al. | 451/5 |
| 5,453,037 | A | * | 9/1995 | Lehmann | 451/5 |
| 5,899,797 | A | * | 5/1999 | Junker | 451/62 |
| 6,200,200 | B1 | * | 3/2001 | Himmelsbach | 451/62 |
| 7,509,898 | B2 | * | 3/2009 | Tanaka et al. | 82/164 |
| 2006/0121827 | A1 | * | 6/2006 | Junker | 451/5 |
| 2008/0139091 | A1 | * | 6/2008 | Junker | 451/402 |
| 2008/0178719 | A1 | * | 7/2008 | Tanaka et al. | 82/148 |

FOREIGN PATENT DOCUMENTS

| | | |
|---|---|---|
| JP | 7-276175 | 10/1995 |
| JP | 9-123039 | 5/1997 |
| JP | 11-33892 | 2/1999 |
| JP | 2005-262342 | 9/2005 |

* cited by examiner

*Primary Examiner* — Maurina Rachuba
(74) *Attorney, Agent, or Firm* — Oblon, Spivak, McClelland, Maier & Neustadt, L.L.P.

(57) ABSTRACT

It is an object of the present invention to provide a machine tool with a rest apparatus having high supporting stiffness of a workpiece by the rest apparatus and having flexibility to machine a plurality of kinds of the workpieces selectively and to provide a machining method of the machine tool with the rest apparatus.
The machine tool with the rest apparatus comprising a base 10, a spindle head 20 mounted on the base 10 to hold rotatably one end of a workpiece W, a tail stock 30 mounted on the base 10 to be faced to the spindle head 20 and to hold rotatably the other end of the workpiece W, first rest apparatus 52 mounted between the spindle head 20 and the tail stock 30 and fixed to the base 10 un-movably to support the workpiece W, and second rest apparatus 53 mounted between the spindle head 20 and the tail stock 30 and movably mounted on the base 10 to support said workpiece W.

14 Claims, 15 Drawing Sheets

MACHINE TOOL WITH REST APPARATUS AND MACHINING METHOD THEREOF

INCORPORATION BY REFERENCE

The present application claims priority under 35 U.S.C. §119 to Japanese Patent Applications No. 2008-235540, filed on Sep. 12, 2008 and No. 2008-235544, filed on Sep. 12, 2008. The contents of these applications are incorporated herein by reference in the entirety.

BACKGROUND OF THE INVENTION

1. Field of the Invention

The present invention relates to a machine tool with a rest apparatus supporting a workpiece and machining method with the machine tool with the rest apparatus, especially the machine tool with the rest apparatus supporting the workpiece steadily during machining or temporary before and after a holding of the workpiece by a spindle head and a tail stock.

2. Description of the Related Art

It is well known that there are several machine tools with rest apparatuses, for example disclosed in laid-open patent publications of Tokkaihei 11-33892 and Tokkai 2005-262342.

A prior machine tool with the rest apparatus disclosed in former laid-open patent publication has a pair of rest apparatuses movably along an axial direction of a workpiece to achieve high rigidity for supporting the workpiece and to have a flexibility corresponding to any workpieces. Another prior machine tool with the rest apparatus disclosed in latter laid-open patent publication has a fixed rest apparatus and a spindle head and a tail stock movable along an axial direction of the workpiece to achieve improved supporting force or supporting rigidity of the workpiece by the rest apparatus.

Generally speaking, a rest apparatus is positioned closer to a machining position than a spindle head or a tail stock is so that the rest apparatus should receive larger machining or grinding force than the spindle head or the tail stock does. Therefore, supporting rigidity of the workpiece by the rest apparatus affects to machining accuracy greatly. The fixed rest apparatus disclosed in the latter laid-open publication has larger supporting rigidity than that of movable rest apparatus disclosed in the former laid-open publication.

The machine tool with the rest apparatus disclosed in the former laid-open publication has the flexibility, however, it does not change a relative position between a pair of supporting positions because the pair of supporting positions are constructed as one unit of a body. Therefore, it is not applied for cutting a plurality of supported portions of the workpiece those which supported positions are different from that of the other workpiece. The machine tool with the rest apparatus disclosed in the latter laid-open publication does not disclose any technologies to support a plurality of kinds of workpieces selectively.

The other prior machine tool with a rest apparatus is disclosed in a laid-open patent publication of Tokkaihei 9-123039 that includes the rest apparatus having a weight supporter supporting a weight portion of the workpiece and a journal supporter supporting a journal portion of the workpiece.

The machine tool with the rest apparatus disclosed in the last mentioned laid-open patent publication has to change the rest apparatus in accordance with another kind of workpiece. Therefore, an operator should change manually the rest apparatus, needing a lot of manpowers for machining the plural workpieces.

SUMMARY OF THE INVENTION

In view of the previously mentioned circumstances, it is an object of the present invention to provide a machine tool with a rest apparatus having high supporting stiffness of a workpiece by the rest apparatus and having flexibility to machine a plurality of kinds of the workpieces selectively and to provide a machining method of the machine tool with the rest apparatus.

It is another object of the present invention to provide a machine tool with a rest apparatus easily applicable for the plurality of kinds of the workpieces without changing the rest apparatus.

In order to achieve the above and other objects, one aspect of the present invention provides a machine tool with a rest apparatus mainly including first rest apparatus mounted between a spindle head and a tail stock and fixed to a base un-movably to support a workpiece, and second rest apparatus mounted between the spindle head and the tail stock and movably mounted on the base to support the workpiece. Thereby, it can change a distance between the first rest apparatus and the second rest apparatus automatically without using any manpower by constructing the second rest apparatus movable against the base so that the machine tool with the rest apparatus according to the present invention can has the flexibility corresponding to the plural kinds of workpieces.

The second aspect of the present invention provides a machine tool with a rest apparatus according to the first aspect of the present invention mainly including a first steady rest apparatus fixed to the base and a second steady rest apparatus movable to the base. Thereby, it can achieve high supporting rigidity of the workpiece by the fixed steady rest apparatus as well as the same effect to that of the first aspect of the present invention.

The third aspect of the present invention provides a machine tool with a rest apparatus according to the first aspect of the present invention mainly including the first rest apparatus mounted at a side of the tail stock from the second rest apparatus, and the spindle head having a chuck holding one end of the workpiece. Thereby, rigidity by supporting the workpiece by the chuck can be high in comparison with that by supporting the workpiece by a center of the spindle head. And also supporting rigidity of the workpiece by the first rest apparatus is high in comparison with that by the second rest apparatus because of fixing the first rest apparatus to a base, therefore, the first rest apparatus having higher supporting rigidity is mounted at the side of the tail stock, including a center without any chuck, having lower supporting rigidity so that total rigidity as the whole machine tool can have high rigidity. In other words, it can achieve high machining accuracy with less number of rest apparatuses.

The fourth aspect of the present invention provides a machine tool with a rest apparatus according to the second aspect of the present invention mainly including the second steady rest apparatus having a stopper contacting with a body to adjust two positioned places along approaching and departing directions from and to the spindle head and the tail stock in accordance with a contacting position with the body. Thereby, it can easily adjusts the position of the second steady rest apparatus by adjusting the contacting position.

The fifth aspect of the present invention provides a machine tool with a rest apparatus according to the second aspect of the present invention mainly including a first temporary rest apparatus fixed to the base and a second temporary rest apparatus movable to the base. Thereby, it can change a distance between the first temporary rest apparatus and the second temporary rest apparatus automatically without using any manpower by constructing the second temporary rest apparatus movable against the base so that it can has the flexibility corresponding to the plural kinds of workpieces. And also, since the first temporary rest apparatus is fixed to the base, temporary supporting rigidity of the workpiece by the first temporary rest apparatus is relatively high so that the workpiece can be supported temporary in stable.

The sixth aspect of the present invention provides a machine tool with a rest apparatus according to the fifth aspect of the present invention mainly including a temporary rest apparatus supporting the workpiece temporary and adjusted a distance from a center of the workpiece in accordance with operation of a cylinder. Thereby, it can change the distance of the temporary rest apparatus from the workpiece so that it can easily respond to the plural kinds of the workpiece having different diameters.

The seventh aspect of the present invention provides a machining method of a machine tool with a rest apparatus mainly comprising steps of first positioning step positioning one workpiece of two kinds of workpieces along an axial direction of the one workpiece in a way that first supported position of the one workpiece is coincided with the first rest apparatus, and first holding step holding the one workpiece by the spindle head and the tail stock after at least one of the spindle head and the tail stock is adjusted along the axial direction to hold the one positioned workpiece. Thereby, every workpiece is positioned on a basis of a reference by the first rest apparatus, and thereafter the spindle head and the tail stock is adjusted on a basis of the positioned workpiece so that it can be applicable to the plural kinds of workpieces even though the first rest apparatus is fixed.

The eighth aspect of the present invention according to the seventh aspect of the present invention provides a machining method of a machine tool with a rest apparatus further comprising mainly steps of first rest supporting step supporting the one workpiece of the two kinds of workpieces by the second rest apparatus after the second rest apparatus is adjusted along the axial direction to support second supported position of the one workpiece, and second rest supporting step supporting the other workpiece of the two kinds of workpieces by the second rest apparatus after the second rest apparatus is adjusted to a different position from that for the one workpiece along the axial direction to support second supported position of the other workpiece. Thereby, the position of the second rest apparatus is adjusted on a basis of a reference of the positioned workpiece, in other words, the position of the second rest apparatus is adjusted on a basis of a reference of the position of the first rest apparatus so that the plural kinds of the workpieces can be positioned by the plural rest apparatuses.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

A preferred embodiment of a machine tool with a rest apparatus and a machining method thereof according to the present invention will be described referring to FIG. 1 to FIG. 15. FIG. 1 to FIG. 4 show first embodiment of the present invention of the machine tool with the rest apparatus according to the present invention, especially the rest apparatus in the first embodiment concerns about a steady rest apparatus. FIG. 5 to FIG. 15 show second embodiment of the present invention of the machine tool with the rest apparatus according to the present invention, especially the rest apparatus in the second embodiment concerns about a temporary rest apparatus. Usually the steady rest apparatus is used for supporting the workpiece with receiving machining force steadily for preventing the workpiece from bending during machining, and the temporary rest apparatus is usually used for temporary supporting the workpiece when the workpiece is loaded in a machining area before machining.

One example of the machine tool according to the present invention is explained about a grinding machine hereinafter. However, the machine tool with the rest apparatus may be a turning machine and another machine tool with the rest apparatus.

First Embodiment of the Present Invention

Figure 1:
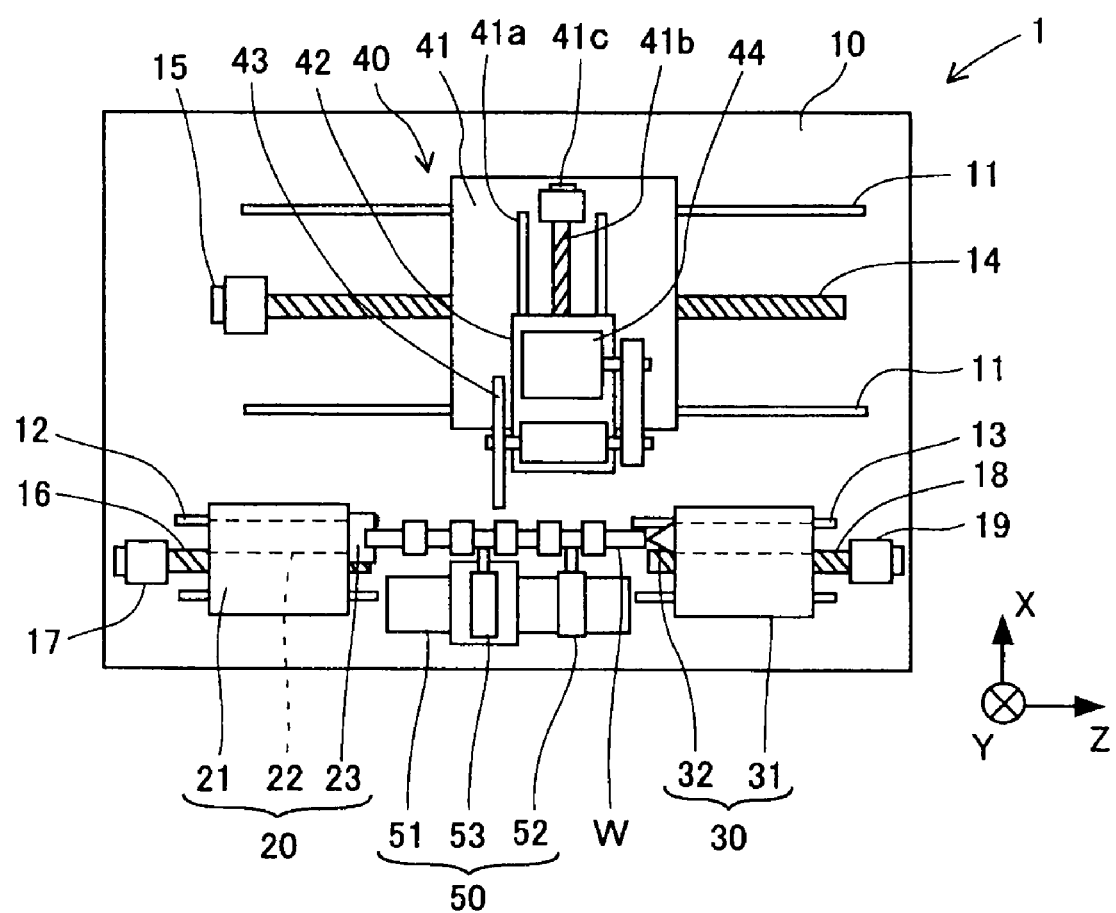
FIG. 1 is a plan view of the grinding machine 1 according to first embodiment of the present invention.

The first embodiment of the present invention is the machine tool with the steady rest apparatus. A whole construction of a grinding machine 1 of the present invention will be explained referring to FIG. 1. FIG. 1 is a plan view of the grinding machine 1. As shown in FIG. 1, the grinding machine 1 includes a bed 10, a spindle head 20, tail stock 30, a grinding wheel supporting device 40, a steady rest apparatus 50 and an un-illustrated controller.

The bed 10 is a rectangular shape and installed on a floor. On a top surface of the bed 10 are mounted a pair of guide rails 11 extending along a Z-axis of right and left directions in FIG. 1 and the pair of guide rails 11 are parallel each other. On the pair of guide rails 11 is slidable a wheel slide traversing table 41 constructing the grinding wheel supporting device 40. On a left portion of the top surface of the bed 10 where is a lower part from the pair of guide rails 11 in FIG. 1 is mounted a pair of second guide rails 12 extending along the Z-axis of right and left directions in FIG. 1 and the pair of second guide rails 12 are parallel each other. The spindle head 20 is slidable on the pair of second guide rails 12. On a right portion of the top surface of the bed 10 where is the lower part from the pair of guide rails 11 in FIG. 1 is mounted a pair of third guide rails 13 extending along the Z-axis of right and left directions in FIG. 1 and the pair of third guide rails 13 are parallel each other. The tail stock 30 is slidable on the pair of third guide rails 13.

A Z-axis ball screw 14 for the wheel head is installed on the bed 10 between the pair of guide rails 11 for the wheel head to drive the wheel head traversing base 41 along the right and left directions in FIG. 1. A Z-axis motor 15 is mounted for driving rotatably the Z-axis ball screw 14 for the wheel head between the pair of guide rails 11. A second Z-axis ball screw 16 is installed on the bed 10 between the pair of second guide rails 12 to drive the spindle head 20 along the right and left directions in FIG. 1. A second Z-axis motor 17 is mounted for driving rotatably the second Z-axis ball screw 16 between the pair of second guide rails 12. A third Z-axis ball screw 18 is installed on the bed 10 between the pair of third guide rails 13 to drive the tail stock 30 along the right and left directions in FIG. 1. A third Z-axis motor 19 is mounted for driving rotatably the third Z-axis ball screw 18 between the pair of third guide rails 13.

The spindle head 20 includes a spindle head housing 21, a spindle 22 and a spindle chuck 23. The spindle head housing 21 is slidably mounted on the pair of the second guide rails 12 on the top surface of the bed 10. The spindle head housing 21 is connected to a nut member of the second Z-axis ball screw 16 to be moved along the pair of second guide rails 12 in accordance with a driving by the second Z-axis motor 17. In an interior of the spindle head housing 21 is mounted the spindle 22 rotatably around an axis parallel to the Z-axis in FIG. 1 and penetrated through the spindle head housing 21. The spindle 22 is rotatably driven by an un-illustrated motor. A spindle chuck 23 is mounted on a right end of the spindle 22 to support and hold an end of a long workpiece W along its longitudinal direction. One example of the workpiece W in the embodiment of the present invention is a cam shaft having a plurality of ground cams and a plurality of journal portions. The grinding machine 1 grinds the plural cams of the cam shaft W and steady rest apparatuses 52, 53, explained hereinafter, support respectively one of the plural journal portions.

The tail stock 30 includes a tail stock housing 31 and a tail center 32. The tail stock housing 31 is slidably mounted on the pair of the third guide rails 13 on the top surface of the bed 10. The tail stock housing 31 is connected to a nut member of the third Z-axis ball screw 18 to be moved along the pair of third guide rails 13 in accordance with a driving by the third Z-axis motor 19. In an interior of the tail stock housing 31 is formed a hall to be penetrated through the tail stock housing 31 along right and left directions in FIG. 1. The tail center 32 is rotatably supported to penetrate the penetrated hole of the tail stock housing 31. A rotational axis of the tail center 32 is aligned on the same axis to a rotational axis of the spindle 22. The tail center 32 supports the other end of the workpiece W along its longitudinal direction. In other words, the tail center 32 is arranged to be faced to the spindle chuck 23. Therefore, the workpiece W is supported at both ends by the spindle chuck 23 and the tail center 32 for rotation around the spindle axis parallel to the Z-axis.

The grinding wheel supporting device 40 includes a wheel slide traversing base 41, a wheel slide 42, a grinding wheel 43 and a grinding wheel rotating motor 44. The wheel slide traversing base 41 is formed as a flat and rectangular shape and installed slidably on the pair of guide rails 11 of the top surface of the bed 10. The wheel slide traversing base 41 is connected to a nut member of the Z-axis ball screw 14 for the wheel slide to be moved along the pair of guide rails 11 in accordance with a driving by the Z-axis motor 15 for the wheel slide. On a top surface of the wheel slide traversing table 41 are mounted a pair of X-axis guide rails 41a extending along a X-axis of up and down directions shown in FIG. 1 and guide rails 41a are parallel each other. The wheel slide 42 is slidable on the pair of guide rails 41a. An X-axis ball screw 41b is installed on the wheel slide traversing base 41 between the pair of X-axis guide rails 41a to drive the wheel slide 42 along the up and down directions in FIG. 1. An X-axis motor 41c is mounted for driving rotatably the X-axis ball screw 41b.

The wheel slide 42 is slidable on the pair of guide rails 41a of the top surface of the wheel slide traversing base 41. The wheel slide 42 is connected to a nut of the X-axis ball screw 41b to be moved along the pair of X-axis guide rails 41a by driving the X-axis motor 41c. Therefore, the wheel slide 42 is movable along the X-axis direction and the Z-axis direction relatively against the bed 10, the spindle head 20 and the tail stock 30. The Z-axis direction is called as a traverse feed direction.

A penetrating hole is formed through a lower part of the wheel slide 42 along right and left directions in FIG. 1. An un-illustrated grinding wheel rotational axis member is rotatably supported on the penetrating hole of the wheel slide 42 around a grinding wheel axis parallel to the Z-axis. A grinding wheel 43 is mounted on one end of the un-illustrated grinding wheel rotational axis member, and the one end is shown at a left end in FIG. 1. A grinding wheel motor 44 is installed on a top surface of the wheel slide 42. A pulley is engaged with a rotational axis of the grinding wheel motor 44 and the other end of the un-illustrated grinding wheel rotational axis member to drive for rotating the grinding wheel 43 around the grinding wheel axis by a driving of the grinding wheel motor 44.

The steady rest apparatus 50 provides a base plate 51, first steady rest apparatus 52 and second steady rest apparatus 53. The base plate 51 is fixed between the second guide rails 12 and the third guide rails 13. The base plate 51 is rectangular, and a longitudinal axis of the base plate 51 is coincided with the right and left directions in FIG. 1. The base plate 51 is mounted under a mounting position of the workpiece W along the Y-axis in an area faced to the spindle head 20 and the tail stock 30. The base plate 51 is mounted below the rotational axes of the spindle 22 and the tail center 32 along the X-axis so that the base plate 51 is positioned at the opposite side of the rotational axis of the workpiece from the grinding wheel 43. A base in the present invention corresponds to the bed 10 and the base plate 51 in one embodiment of the present invention.

The first and the second steady rest apparatuses 52, 53 are mounted on the base plate 51. Therefore, the first and the second steady rest apparatuses 52, 53 are positioned between the spindle head 20 and the tail stock 30. A guide convex portion is formed on the base plate 51. The first and the second steady rest apparatuses 52, 53 support the workpiece W in cooperation with holdings by the spindle head 20 and the tail stock 30 during machining. The first and the second steady rest apparatuses 52, 53 support steadily middle portions of the workpiece W along the axial direction in order to prevent the workpiece W from being bent by grinding force as explained hereinbefore.

The first steady rest apparatus 52 is fixed un-movably on the base plate 51. On the other hand, the second steady rest apparatus 53 is mounted movably along the Z-axis on the base plate 51. The first steady rest apparatus 52 is positioned between the second steady rest apparatus 53 and the tail stock 30. In other words, the first steady rest apparatus 52 is mounted farther from the spindle head 20 than the second steady rest apparatus 53. Detail constructions of the first and the second steady rest apparatuses 52, 53 will be explained hereinafter.

A controller controls numerically the rotation of the spindle 22, and an X-axis position and a Z-axis position of the wheel slide 42. The grinding wheel 43 is rotated to grind a peripheral surface of the workpiece W by the way of being controlled the X-axis position and the Z-axis position of the grinding wheel 43 relative to the workpiece W by the controller.

Figure 2:
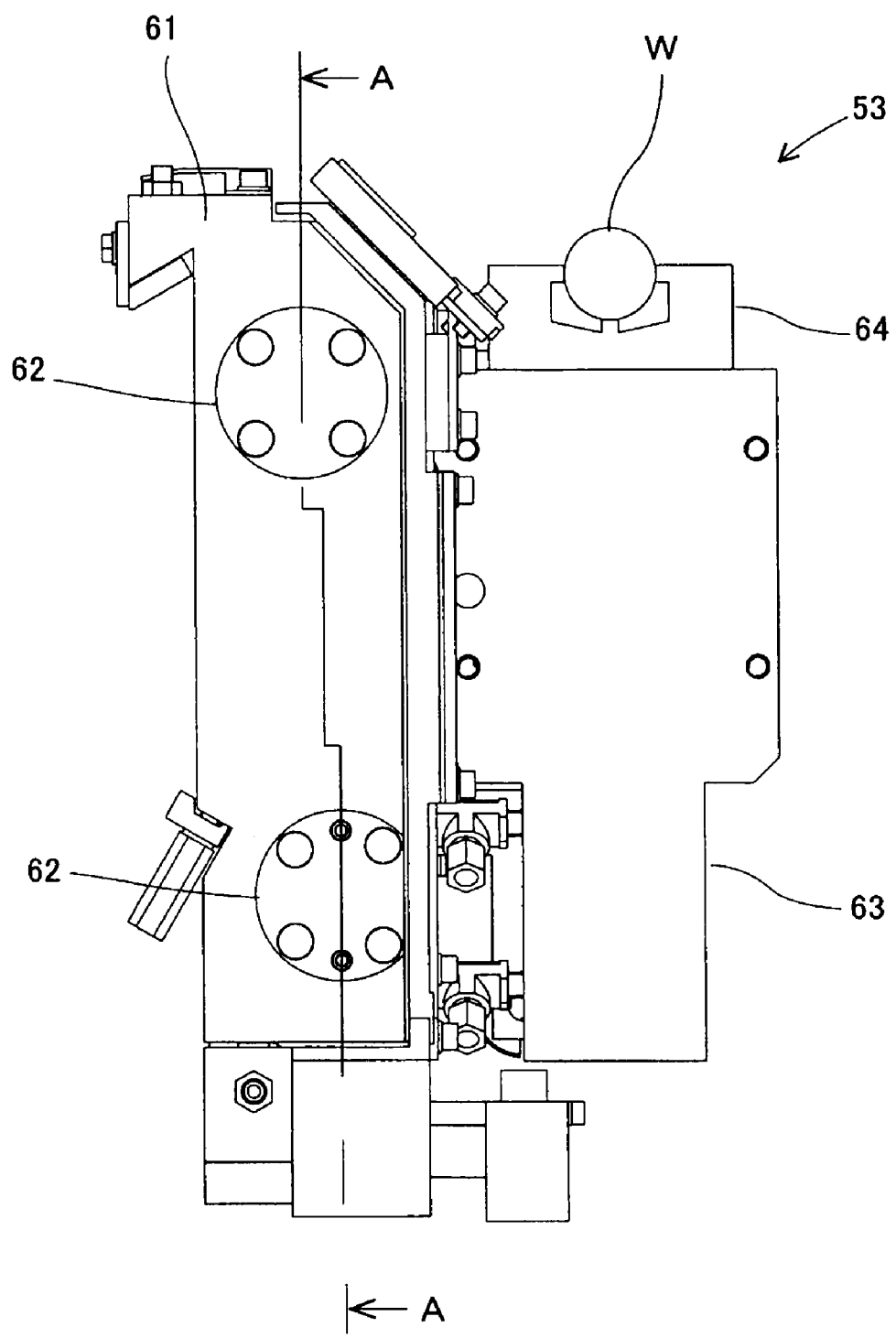
FIG. 2 is a side view from left of the second steady rest apparatus 53 shown in FIG. 1.
Figure 3:
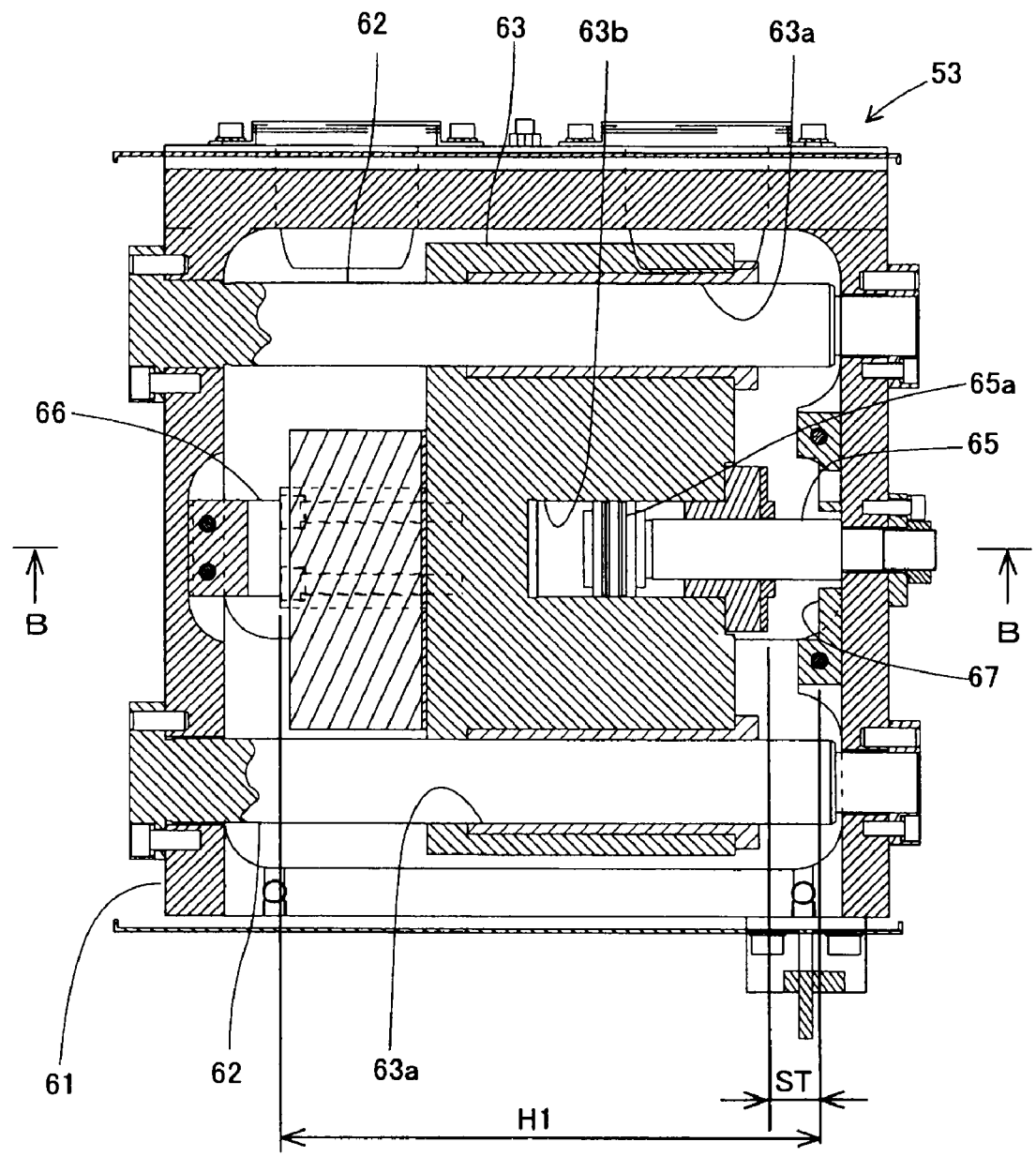
FIG. 3 is a sectional view by A-A line in FIG. 2.
Figure 4:
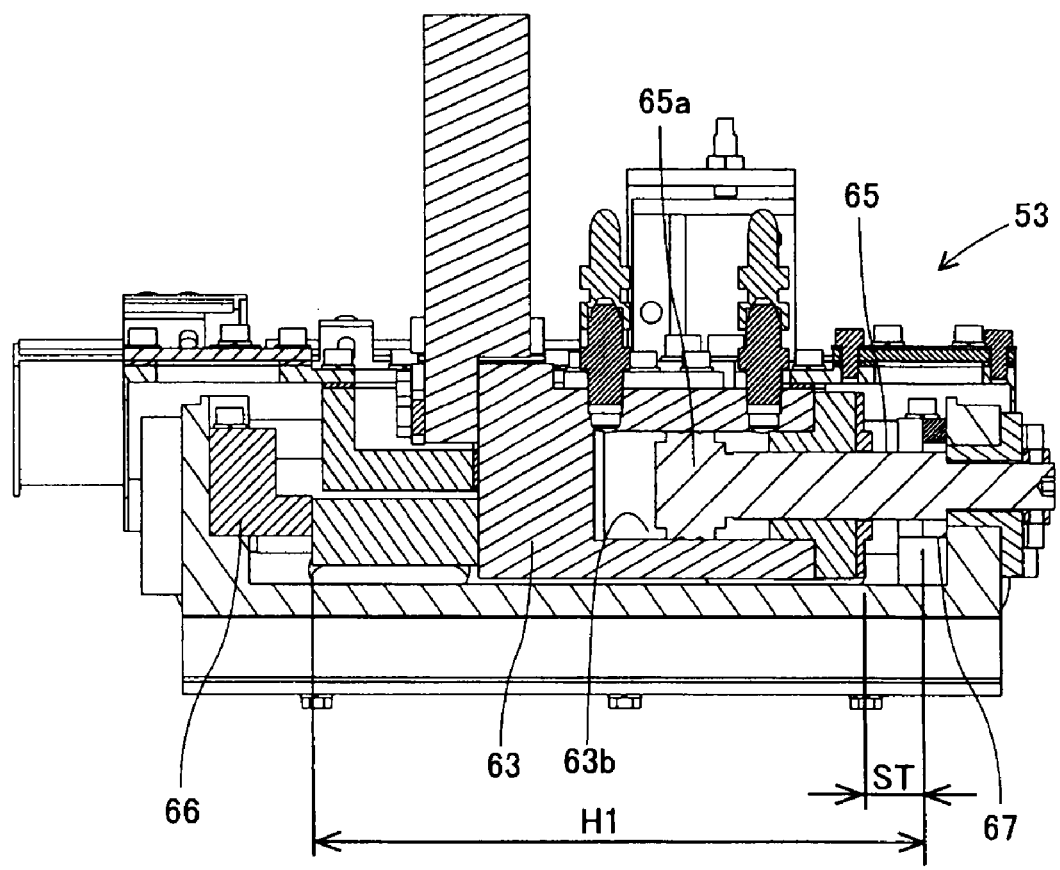
FIG. 4 is a sectional view by B-B line in FIG. 3.

Next, detail constructions of the first and the second steady rest apparatuses 52, 53 are explained here referring to FIG. 2 to FIG. 4. FIG. 2 is a side view from left of the second steady rest apparatus 53 shown in FIG. 1, FIG. 3 is a sectional view by A-A line in FIG. 2 and FIG. 4 is a sectional view by B-B line in FIG. 3.

As shown in FIG. 2 to FIG. 4, the second steady rest apparatus 53 includes a rest base 61, a pair of guides 62, a body 63, a rest supporter 64, a cylinder 65, first stopper 66 and second stopper 67.

The rest base 61 is almost rectangular and is fixed to the guide convex portion of the base plate 51. The rest base 61 has a rectangular concave portion on its top surface. Each of the pair of guides 62 is cylindrical respectively and is extended along the Z-axis, and is also fixed to the rest base 61 in parallel each other. The pair of guides 62 are mounted in an interior portion of the concave portion of the rest base 61.

An under part of the body 63 is accommodated in the concave portion of the rest base 61. The under part of the body 63 has one un-penetrating hole 63b and a pair of penetrating holes 63a through which the pair of guides 62 penetrate respectively. The body 63 is movable against the rest base 61 along the Z-axis by the way of being guided by the pair of guides 62. The rest supporter 64 is mounted to be projected from an upper portion of the body 63 in FIG. 1. The rest supporter 64 includes three claws supporting and centering the workpiece W. The claws of the rest supporter 64 are movable in opening and closing by a hydraulic device. One example of the body of the steady rest apparatus in the first embodiment of the present invention is a steady rest manufactured by Abrotech Systems, Inc., U.S.A and one example of detail construction of the steady rest is disclosed in U.S. Pat. No. 5,237,780.

The cylinder 65 includes a sliding part 65a slidable through the un-penetrating hole 63b in the under part of the body 63 and one end of the cylinder 65 is fixed to the rest base 61. An axial direction of the cylinder 65 coincides with an axial direction of each of the pair of guides 62. A chamber of an interior portion of the un-penetrating hole 63b is filled up by driving oil and is divided into two parts by a piston 65a. Therefore, the cylinder 65 and the un-penetrating hole 63b construct a cylinder mechanism.

A right part of the un-penetrating hole 63b from the piston 65a in FIG. 3 is called a tail stock part and a left part of the un-penetrating hole 63b from the piston 65a in FIG. 3 is called a spindle head part. Oil pressure in the tail stock part becomes smaller than that in the spindle head part, thereby to move the body 63 against the sliding part 65a so that the body 63 moves toward the spindle head 20 against the sliding part 65a. A stopping position of movable body 63 is decided by first stopper 66. The first stopper 66 is mounted on a part of the rest base 61 in a side of spindle head 20 of the body 63. The first stopper 66 is a member adjustable the stopping position of the body 63 in the side of the spindle head 20. Therefore, the first stopper 66 can adjust the stopping position of the body 63 in the side of the spindle head 20 along the Z-axis in accordance with an abutment position of the body 63 against the first stopper 66.

In opposite occasion, oil pressure in the tail stock part becomes larger than that in the spindle head part, thereby to move the body 63 against the sliding part 65a so that the body 63 moves toward the tail stock 30 against the sliding part 65a. A stopping position of the body 63 is decided by the second stopper 67. The second stopper 67 is mounted on a part of the rest base 61 in a side of the tail stock 30 of the body 63. The second stopper 67 is a member adjustable the stopping position of the body 63 in the side of the tail stock 30. Therefore, the second stopper 67 can adjust the stopping position of the body 63 in the side of the tail stock 30 along the Z-axis in accordance with an abutment position of the body 63 against the second stopper 67.

FIG. 3 and FIG. 4 show a state that the body 63 contacts with the first stopper 66, in other words the body 63 is positioned in the side of the spindle head 20. A movable distance of the body 63 is between the first stopper 66 and the second stopper 67, that is to say the body 63 is movable within a distance H1 shown in FIG. 3 and FIG. 4. A distance between the second stopper 67 and a part of the body 63 contacting with the second stopper 67 is a distance ST shown in FIG. 3 and FIG. 4. Oil pressure in the tail stock part becomes larger than that in the spindle head part, the body 63 moves the distance ST toward the tail stock 30.

Therefore, the rest supporter 64 and the body 63 of the second steady rest apparatus 53 is positioned at two places predetermined by the first stopper 66 and the second stopper 67 by introducing oil pressure in the tail stock part and the spindle head part of the sliding part 65a. The rest supporter 64 of the second steady rest apparatus 53 is movable to the two places set by the first stopper 66 and the second stopper 67.

The first steady rest apparatus 52 has almost same construction to the second steady rest apparatus 53 except for the movable construction of the body 63. Therefore, a body 63 in the first steady rest apparatus 52 is fixed to the base plate 51 on the contrary of the moving of the body 63 in the second steady rest apparatus 53.

[Machining Method of the Grinding Machine 1]

The machining method of the grinding machine 1 will be explained here. Here is the explanation to machine selectively each of two kinds of the workpiece W. It will be explained the machining method comprising a first machining step for one kind of the workpiece W 1 at first and then a second machining step for another kind of the workpiece W2.

For the first machining step machining the workpiece W1, the second steady rest apparatus 53 is adjusted along the Z-axis direction in first adjusting step for supporting a predetermined second supported position of the one kind of the workpiece W1 that will be positioned later.

Then, the one workpiece W1 is positioned along its axial direction in first positioning step in a way that first supported position of the one workpiece W1 is coincided with a rest supporter 64 of the first steady rest apparatus 52. The positioning of the one workpiece W1 is performed by an un-illustrated loader or an un-illustrated robot loading the one workpiece W1. Then, the one workpiece W1 is supported temporary by the rest supporters 64 of the first steady rest apparatus 52 and the second steady rest apparatus 53 at opening position of the rest supporters 64. Therefore, the first steady rest apparatus 52 and the second steady rest apparatus 53 function as a temporarily rest only in this step.

At least one of the spindle head 20 and the tail stock 30 is adjusted along the Z-axis direction to hold the one positioned workpiece W1 and then both of the spindle head 20 and the tail stock 30 hold the one workpiece W1 in first holding step. Next, the first steady rest apparatus 52 and the second steady rest apparatus 53 support steadily the one workpiece W1 at closing position of the rest supporters 64 and center a center of the one workpiece W1 in coincide with centers of the spindle 22 of the spindle head 20 and the tail center 32 of the tail stock in first rest supporting step. Finally, the machining of the one workpiece W1 is started.

For the second machining step machining the other kind of the workpiece W2, the second steady rest apparatus 53 is adjusted along the Z-axis direction in second adjusting step for supporting a predetermined second supported position of the other workpiece W2 that will be positioned later. A position of the second steady rest apparatus 53 along the Z-axis direction is different from that of the second steady rest apparatus 53 for the one workpiece W1.

Then, the other workpiece W2 is positioned along its axis direction in second positioning step in a way that first supported position of the other workpiece W2 is coincided with the rest supporter 64 of the first steady rest apparatus 52. The positioning of the other workpiece W2 is performed by the un-illustrated loader or the un-illustrated robot loading the other workpiece W2. Then, the other workpiece W2 is supported temporary by the rest supporters 64 of the first steady rest apparatus 52 and the second steady rest apparatus 53 at the opening position of the rest supporters 64. Therefore, the first steady rest apparatus 52 and the second steady rest apparatus 53 function as the temporarily rest only in this step.

At least one of the spindle head 20 and the tail stock 30 is adjusted along the Z-axis direction to hold the other positioned workpiece W2 and then both of the spindle head 20 and the tail stock 30 hold the other workpiece W2 in second holding step. Positions of the spindle head 20 and the tail stock 30 are different from those of the spindle head 20 and the tail stock 30 for the one workpiece W1. Next, the first steady rest apparatus 52 and the second steady rest apparatus 53 support steadily the other workpiece W2 at closing position of the rest supporters 64 and center a center of the other workpiece W2 in coincide with centers of the spindle 22 of the spindle head 20 and the tail center 32 of the tail stock in second rest supporting step. Finally, the machining of the other workpiece W2 is started.

Second Embodiment of the Present Invention

The second embodiment of the present invention of the machine tool with the rest apparatus according to the present invention will be explained hereinafter referred to FIG. 5 to FIG. 15. As explained before, the rest apparatus in the second embodiment is the temporary rest apparatus on the contrary of the steady rest apparatus in the first embodiment.

Figure 5:
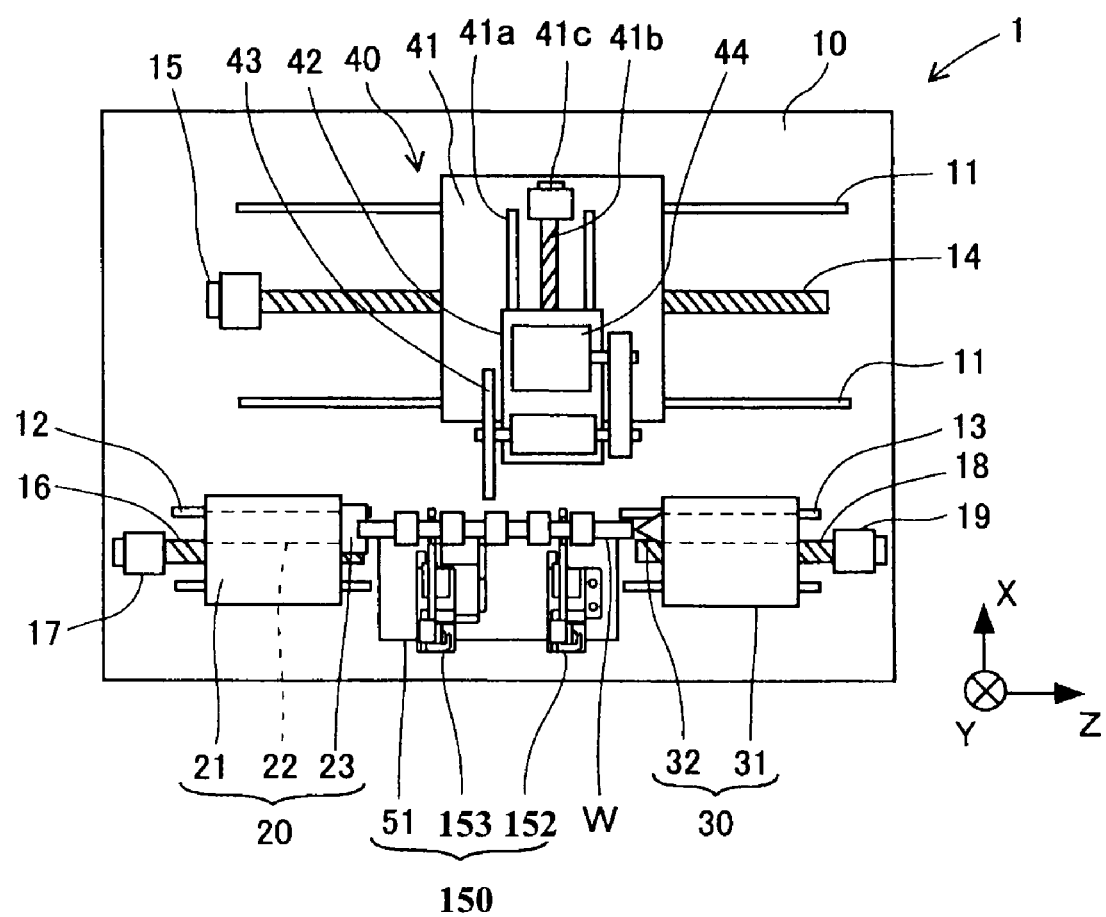
FIG. 5 is a plan view of the grinding machine 1 according to second embodiment of the present invention.

FIG. 5 shows a plan view of the grinding machine 1. A same numeral in FIG. 5 to that in FIG. 1 performs the same function so that the explanation of the function of the same numeral is omitted except for a temporary rest apparatus 150, a first temporary rest apparatus 152 and a second temporary rest apparatus 153 in FIG. 5. The first temporary rest apparatus 152 and the second temporary rest apparatus 153 support temporary the workpiece W before the workpiece W loaded by the robot or the loader before machining is held by the spindle head 20 and the tail stock 30. Further, the first temporary rest apparatus 152 and the second temporary rest apparatus 153 support temporary the workpiece W after machining in order to load out the machined workpiece W. Therefore, the first temporary rest apparatus 152 and the second temporary rest apparatus 153 support temporary the workpiece W before and after holdings by the spindle head 20 and the tail stock 30. Besides, on the contrary of the second embodiment, in the first embodiment the first steady rest apparatus 52 and the second steady rest apparatus 53 support the workpiece W during machining in cooperation with holdings by the spindle head 20 and the tail stock 30.

Figure 6:
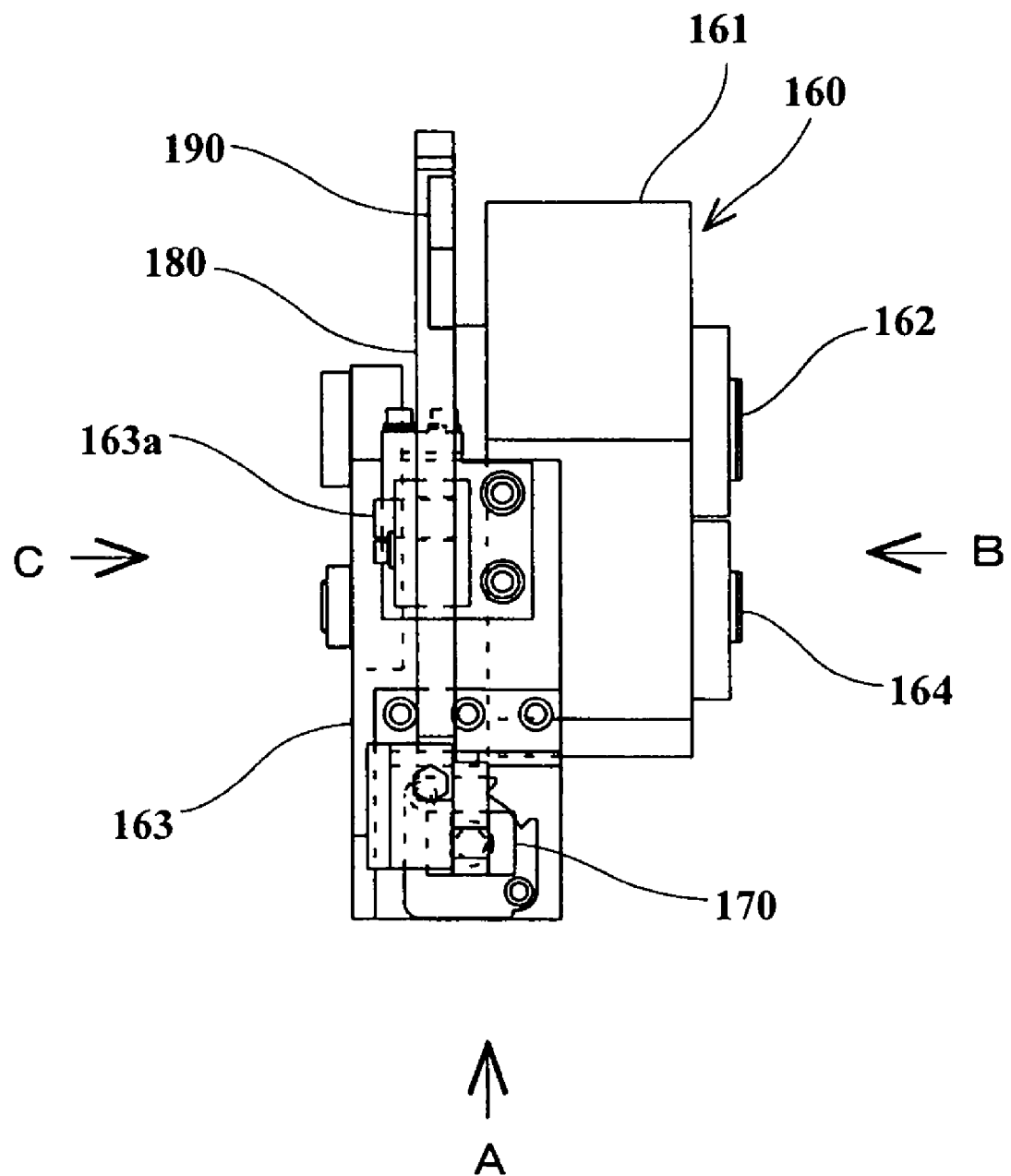
FIG. 6 is a plan view of the second temporary rest apparatus 153 shown in FIG. 5.
Figure 7:
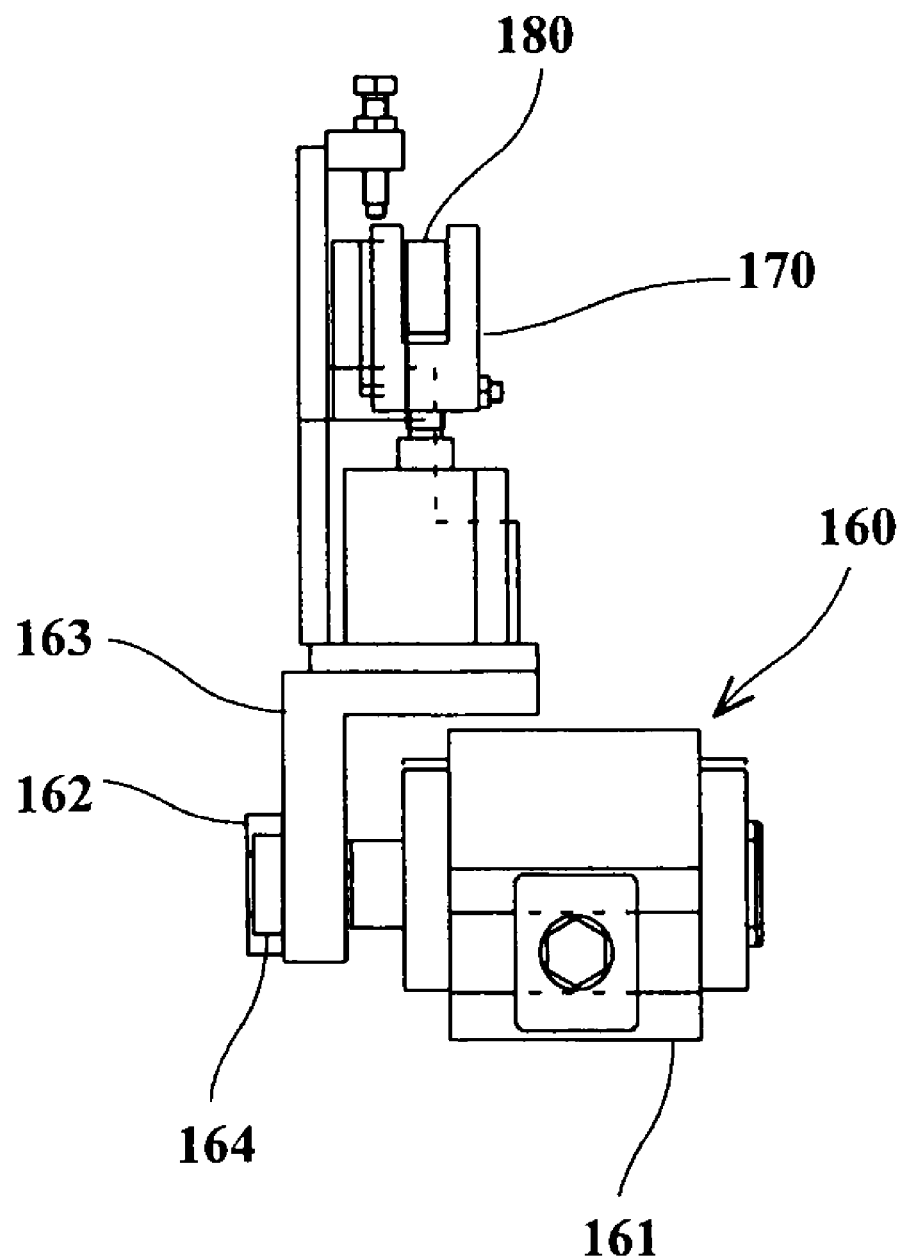
FIG. 7 is a side view from A direction in FIG. 6.
Figure 8:
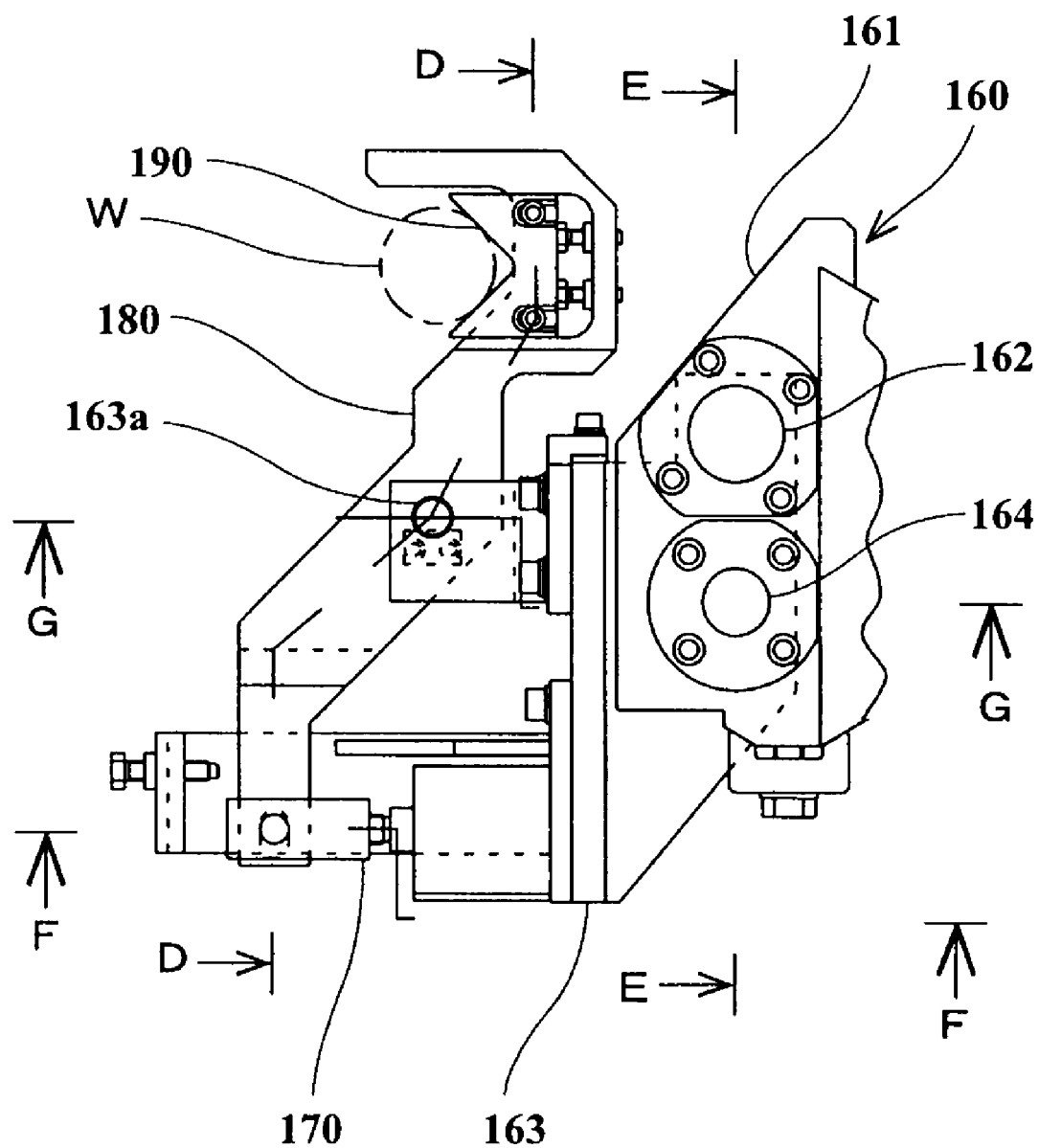
FIG. 8 is a side view from B direction in FIG. 6.
Figure 9:
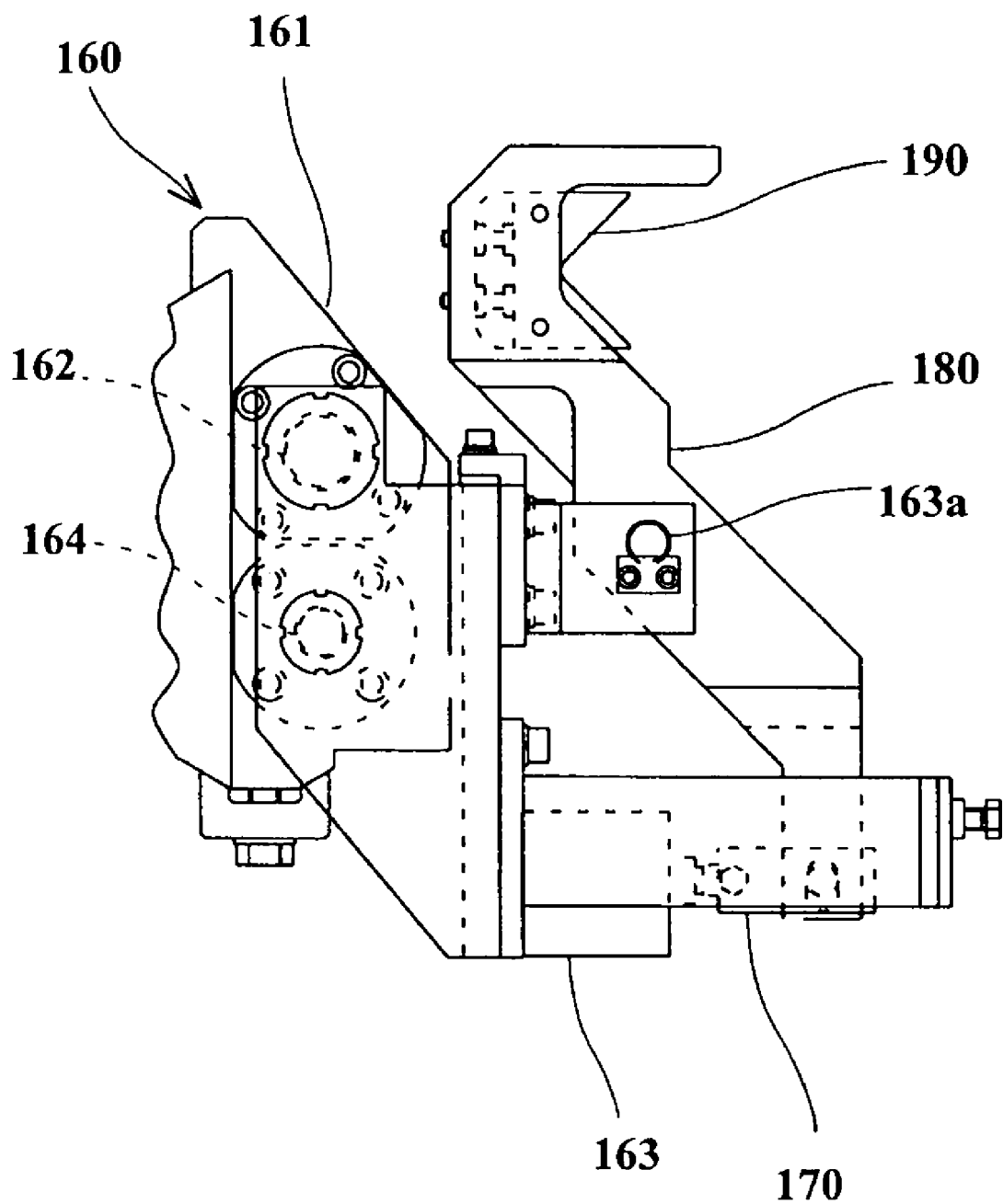
FIG. 9 is a side view from C direction in FIG. 6.
Figure 10:
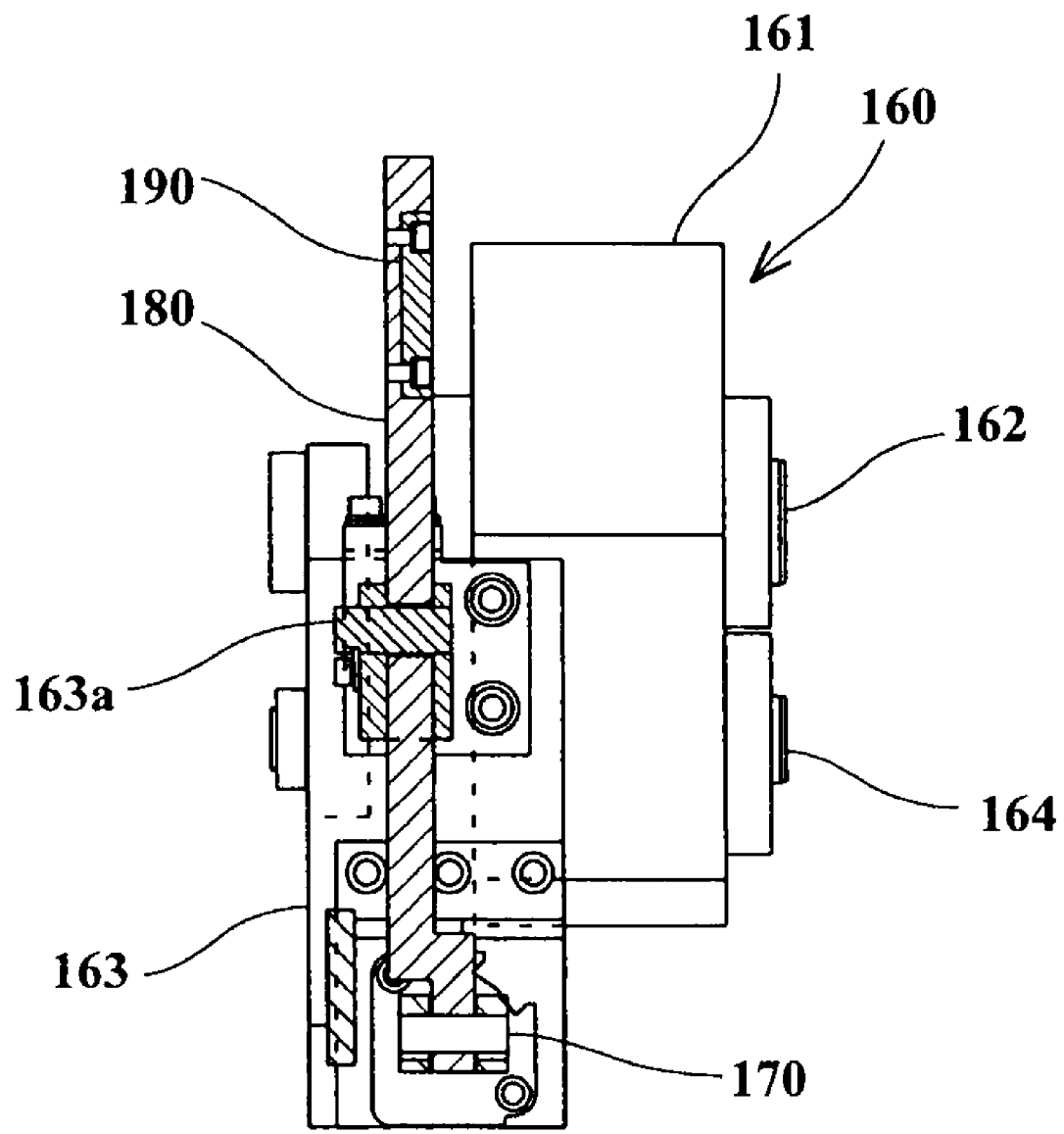
FIG. 10 is a sectional view by D-D line in FIG. 8.
Figure 11:
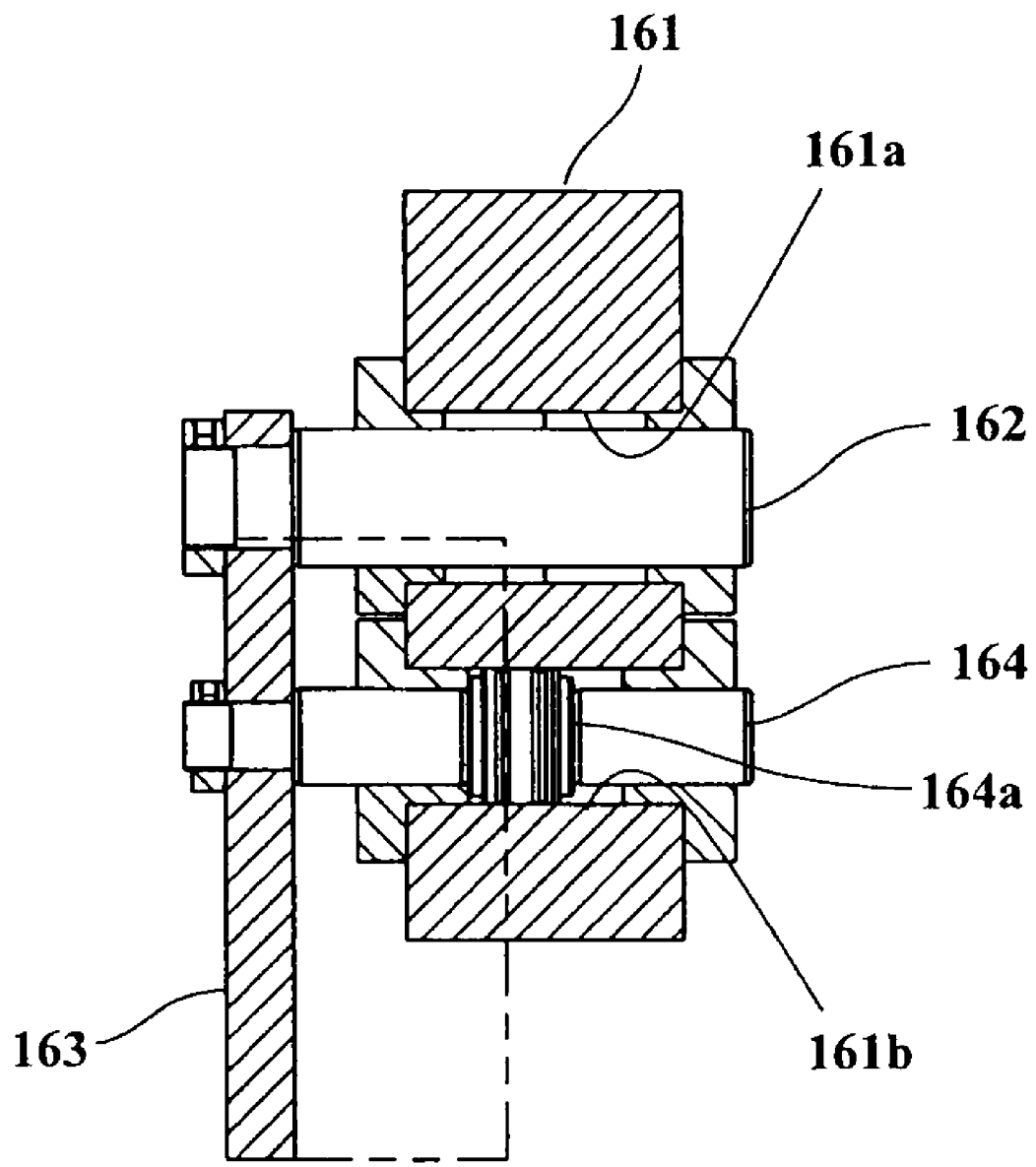
FIG. 11 is a sectional view by E-E line in FIG. 8.
Figure 12:
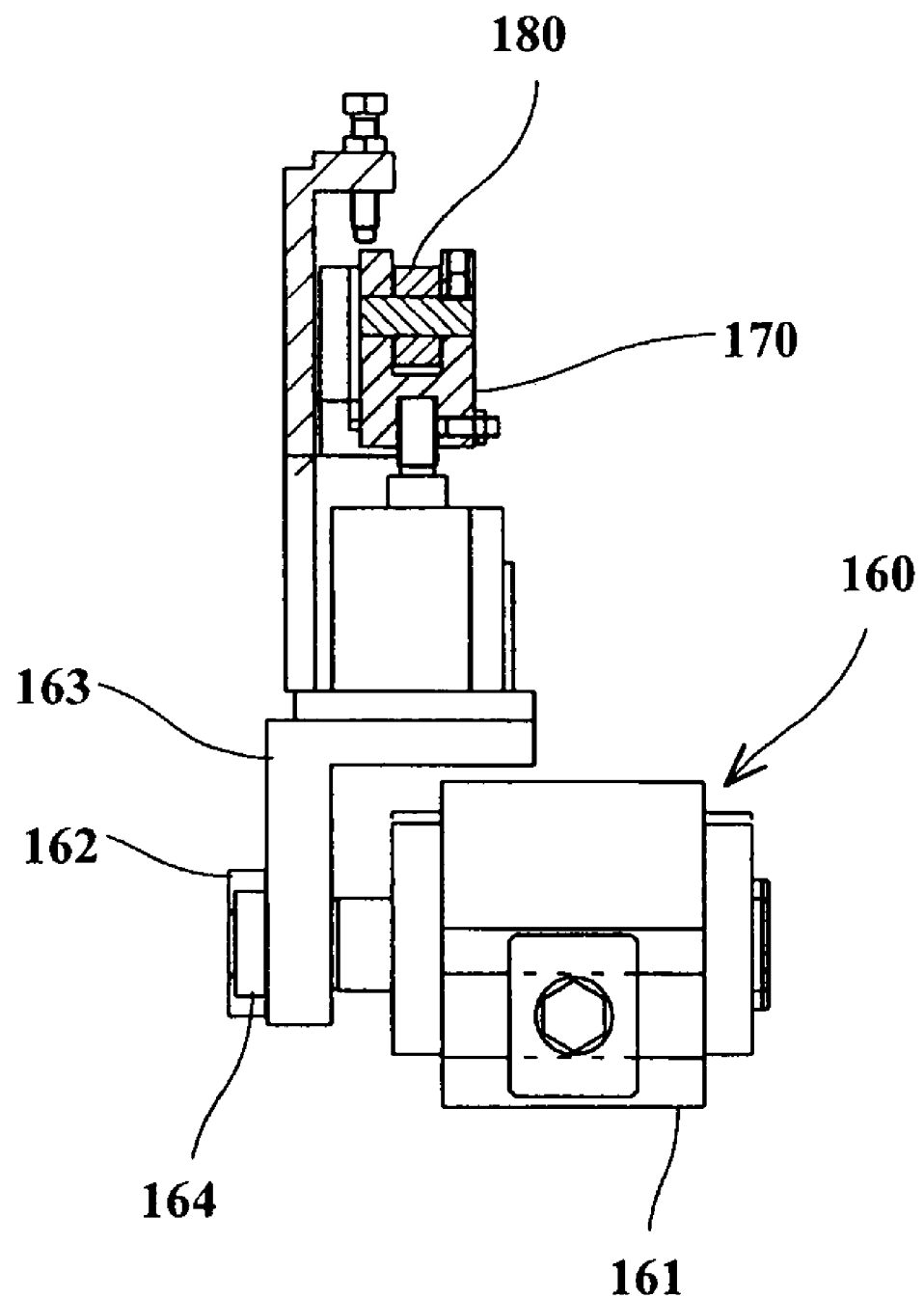
FIG. 12 is a sectional view by F-F line in FIG. 8.
Figure 13:
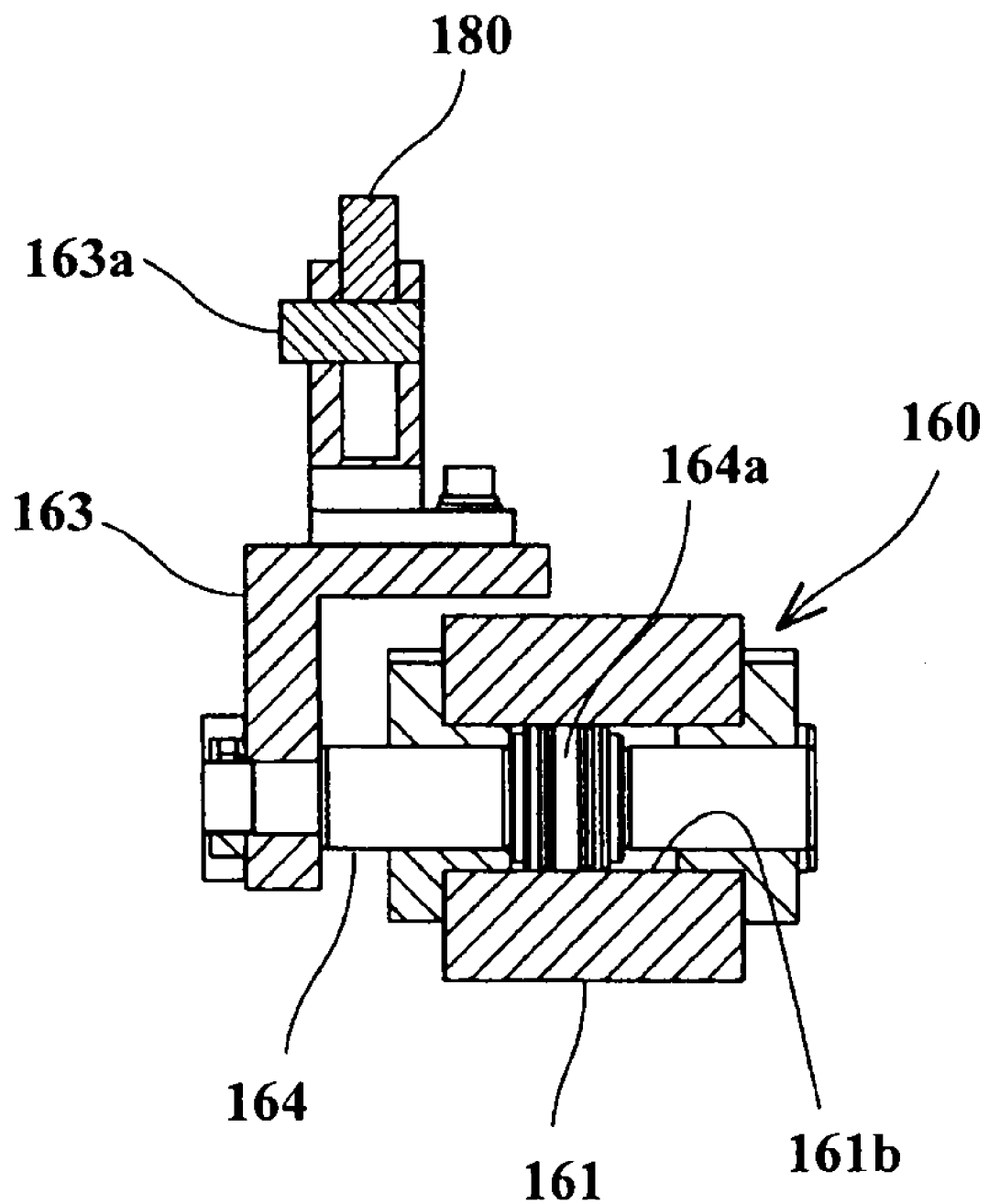
FIG. 13 is a sectional view by G-G line in FIG. 8.

Next, a detail construction of the second temporary rest apparatus 153 is explained here referring to FIG. 6 to FIG. 13. A detail construction of the first temporary rest apparatus 152 will be explained after the explanation of the second temporary rest apparatus 153. FIG. 6 is a plan view of the second temporary rest apparatus 153. FIG. 7 is a side view from A direction in FIG. 6. FIG. 8 is a side view from B direction in FIG. 6. FIG. 9 is a side view from C direction in FIG. 6. FIG. 10 is a sectional view by D-D line in FIG. 8. FIG. 11 is a sectional view by E-E line in FIG. 8. FIG. 12 is a sectional view by F-F line in FIG. 8. And FIG. 13 is a sectional view by G-G line in FIG. 8.

The second temporary rest apparatus 153 includes a second temporary rest body 160, a diameter adjusting cylinder 170, a cradle 180 and a temporary rest 190. The second temporary rest body 160 is mounted on the base plate 51. The second temporary rest body 160 includes a second temporary rest base 161, a guide 162, a body 163 and a cylinder 164. The body 163 is moved against the second temporary rest base 161 along approaching and departing directions from and to the spindle head 20 and the tail stock 30 in the Z-axis direction.

The second temporary rest base 161 is almost rectangular and fixed to the guide convex portion of the base plate 51. The second temporary rest base 161 provides two penetrating holes 161a, 161b. These penetrating holes 161a, 161b are formed to extend in parallel with each other along the Z-axis.

The guide 162 is cylindrical and inserted into the one penetrating hole 161a of the second temporary rest base 161 to be able to move against the second temporary rest base 161 along an axial direction of the one penetrating hole 161a. The body 163 is fixed to one end of the guide 162 so that the body 163 moves with the guide 162 as a body. Therefore, the body 163 is movable against the second temporary rest base 161 along the Z-axis in accordance with an operation of the guide 162. On a top surface of the body 163 is mounted a pivot 163a being an oscillating center of the cradle 180.

The cylinder 164 is almost cylindrical and has a piston 164a slidable in the penetrating hole 161b of the second temporary rest base 161. One end of the cylinder 164 is fixed to the body 163. An axial direction of the cylinder 164 coincides with an axial direction of the guide 162. An interior of the penetrating hole 161b of the second temporary rest base 161 is filled by driving oil and divided into two chambers by the piston 164a. The cylinder 164 and the penetrating hole 161b of the second temporary rest base 161 construct a cylinder mechanism.

A right part of the penetrating hole 161b from the piston 164a is called a tail stock part and a left part of the penetrating hole 161b from the piston 164a is called a spindle head part. When oil pressure in the tail stock part becomes larger than that in the spindle head part, the piston 164a moves against the second temporary rest base 161 to increase a volume in tail stock part so that the body 163 moves toward the spindle head 20 against the second temporary rest base 161. A stopping position of the body 163 against the second temporary rest base 161 is decided by contacting the piston 164a with a cover closing one end of the penetrating hole 161b. The cover closing one end of the penetrating hole 161b is provided at an opening of the penetrating hole 161b in a side of spindle head 20. The cover closing one end of the penetrating hole 161b is a member adjustable the stopping position of the body 163 in the side of the spindle head 20. Therefore, the cover closing one end of the penetrating hole 161b can function as a stopping member for the body 163 in the side of the spindle head 20 against the second temporary rest base 161.

On the contrary, when oil pressure in the tail stock part becomes smaller than that in the spindle head part, the piston 164a moves against the second temporary rest base 161 to decrease a volume in the tail stock part so that the body 163 moves toward the tail stock 30 against the second temporary rest base 161. A stopping position of the movable body 163 against the second temporary rest base 161 is decided by contacting the piston 164a with a cover closing the other end of the penetrating hole 161b. The cover closing the other end of the penetrating hole 161b is provided at an opening of the penetrating hole 161b in a side of tail stock 30. The cover closing the other end of the penetrating hole 161b is a member adjustable the stopping position of the body 163 in the side of the tail stock 30. Therefore, the cover closing the other end of the penetrating hole 161b can function as a stopping member for the body 163 in the side of the tail stock 30 against the second temporary rest base 161.

A diameter adjusting cylinder 170 is mounted on the body 163 of the second temporary rest body 160 and driven by oil pressure or pneumatic pressure. The diameter adjusting cylinder 170 is corresponded to a second cylinder member of the present invention. A movable end portion of the diameter adjusting cylinder 170 is movable along up and down directions parallel to the Y-axis in FIG. 12. The diameter adjusting cylinder 170 is placed apart from the center of the workpiece W along to the X-direction. An axis of the diameter adjusting cylinder 170 does not intersect with the axis of the workpiece W and is movable along the Y-direction which is not parallel to the axis of the workpiece W.

The cradle 180 is supported for oscillating at the pivot 163a of the body 163 in the middle between the workpiece W and the diameter adjusting cylinder 170. One end of the cradle 180 is supported for oscillating at the movable end of the diameter adjusting cylinder 170. Therefore, the cradle 180 is oscillated at a center of the pivot 163a around an axis parallel to the Z-axis according to the movement of the diameter adjusting cylinder 170 against the body 163.

The temporary rest 190 is fixed to the other end of the cradle 180 and is formed a V-letter groove on a top surface of the temporary rest 190. The V-letter groove of the temporary rest 190 is a position receiving the workpiece W temporary. Since the temporary rest 190 is fixed to the other end of the cradle 180, it can adjust the receiving position of the V-letter groove of the temporary rest 190 from a center of the workpiece W according to the movement of the diameter adjusting cylinder 170 against the body 163, thereby to adjust the receiving position of the V-letter groove of the temporary rest 190 according to a change of the diameter of the workpiece W.

Figure 14:
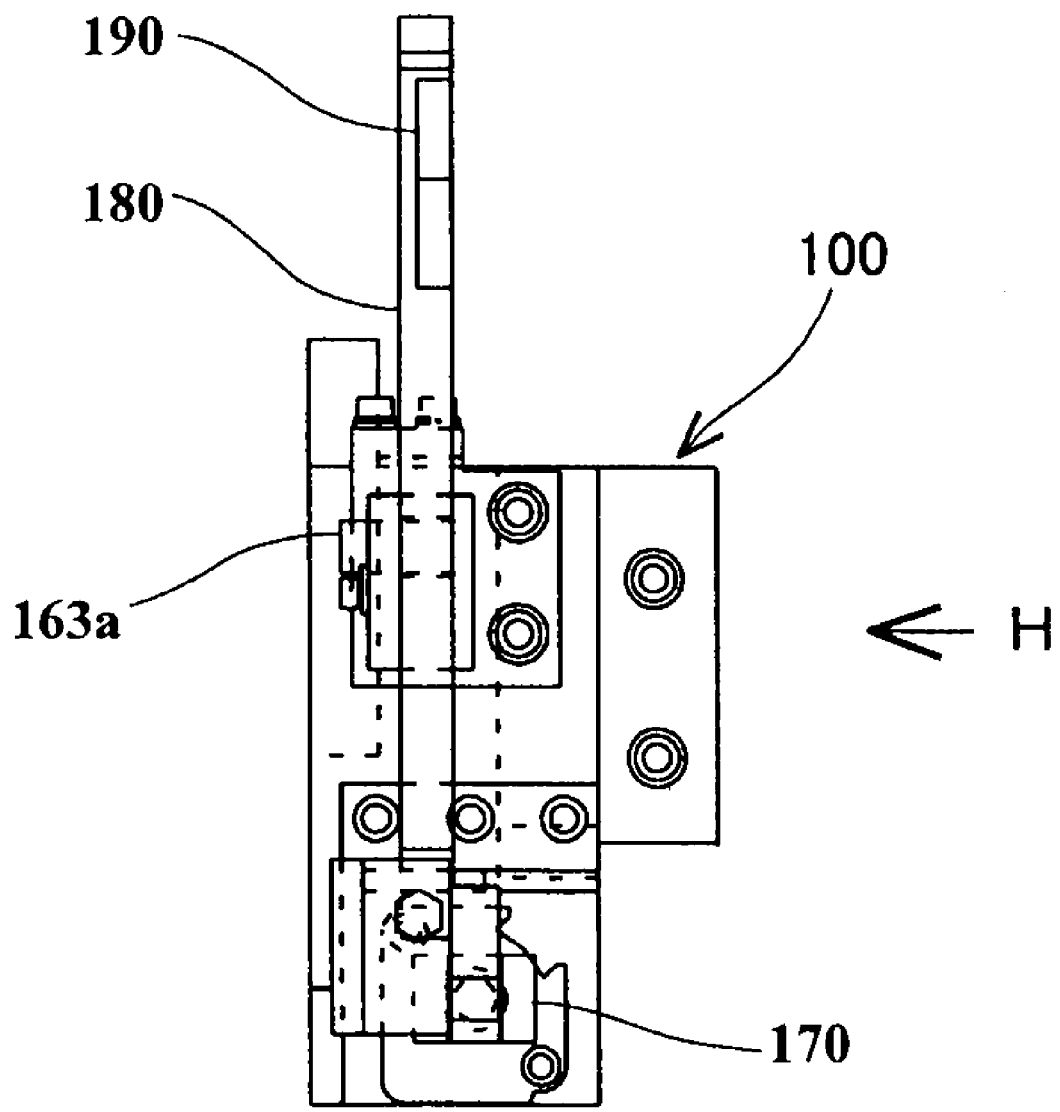
FIG. 14 is a plan view of the first temporary rest apparatus 152 shown in FIG. 5.
Figure 15:
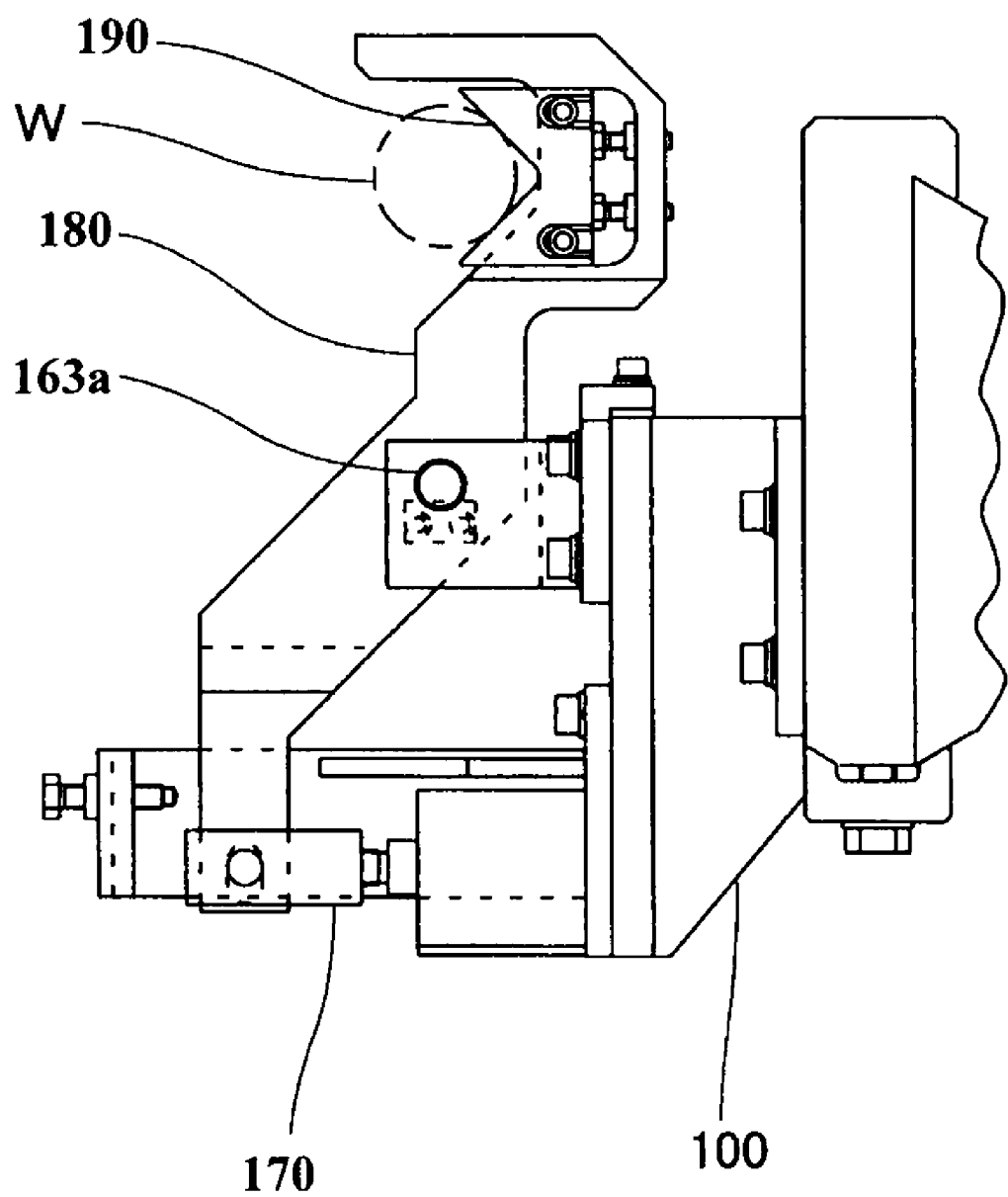
FIG. 15 is a side view from H-direction in FIG. 14.

The first temporary rest apparatus 152 will be explained here referring to FIG. 14 and FIG. 15. FIG. 14 is a plan view of the first temporary rest apparatus 152. FIG. 15 is a side view from H-direction in FIG. 14. The first temporary rest apparatus 152 has almost same construction to the second temporary rest apparatus 153 except for the movable construction of the body 163 against the base plate 51 along the Z-axis direction. Therefore, the body 153 in the first temporary rest apparatus 152 is fixed to the base plate 51 on the contrary of the moving of the body 163 in the second temporary rest apparatus 153.

As shown in FIG. 14 and FIG. 15, the first temporary rest apparatus 152 includes a first temporary rest body 100, another diameter adjusting cylinder 170, another cradle 180 and another temporary rest 190. The first temporary rest body 100 is fixed on the base plate 51 for preventing moving. The first temporary rest body 100 corresponds to a unit body of the second temporary rest body 161 and the body 163 of the second temporary rest apparatus 160. Each of the another diameter adjusting cylinder 170, the another cradle 180 and the another temporary rest 190 of the first temporary rest apparatus 152 is same to each of the diameter adjusting cylinder 170, the cradle 180 and the temporary rest 190 of the second temporary rest apparatus 152 so that the detail construction is not explained.

Third Embodiment of the Present Invention

The third embodiment of the present invention will be described here. The third embodiment of the present invention includes same constructions to the steady rest apparatuses in the first embodiment and the temporary rest apparatuses in the second embodiment so that they are eliminated to be shown by any drawings. In the third embodiment, the first steady rest apparatus 52 and the first temporary rest apparatus 152 are fixed on the base plate 51 respectively and they are faced to fifth bearing portion of the workpiece W from left in same condition to the first and second embodiment as shown in FIG. 1 and FIG. 5. And the second steady rest apparatus 53 and the second temporary rest apparatus 153 in the third embodiment are mounted movably on the base plate 51, and the second steady rest apparatus 53 is faced to third bearing portion of the workpiece W from left in same condition to the first embodiment as shown in FIG. 1 and the second temporary rest apparatus 153 is faced to second bearing portion of the workpiece W from left in same condition to the second embodiment as shown in FIG. 5. The other constructions in third embodiment are same to those in first and second embodiments so that explanations of these constructions are omitted.

A part of the operation of the third embodiment different from that of the first embodiment will be explained here and the other part of the operation are same to that of the first embodiment, thereby omitting these explanations of the operation of the other part. At first, the workpiece W is loaded on the temporary rests 190 of the first and second temporary rest apparatuses 152, 153 and then the workpiece W is steadily supported by the rest supporters 64 of the first and second steady rest apparatuses 52, 53 in order to center the center of the workpiece W in coincide with centers of the spindle 22 of the spindle head 20 and the tail center 32 of the tail stock 30, thereby floating the workpiece W from the top surfaces of the temporary rests 190. And then, the spindle head 20 and the tail stock 30 hold the workpiece W for grinding. While the workpiece W is held by the spindle head 20 and the tail stock 30 after the workpiece W is supported steadily by the steady rest apparatuses 52, 53, however the workpiece W may be supported steadily by the steady rest apparatuses 52, 53 after the workpiece W is held by the spindle head 20 and the tail stock 30.

While the invention has been described in detail with reference to the preferred embodiment, it will be apparent to those skilled in the art that the invention is not limited to the present embodiment, and that the invention may be realized in various other embodiments within the scope of the claims.

For example, while the first embodiment of the present invention is the construction having the spindle chuck 23, however it may be constructed to have a spindle center instead of the spindle chuck 23. In this case, a relative position of the first steady rest apparatus 52 to the second steady rest apparatus 53 may be any position because of the spindle center instead of the spindle chuck. While a number of the steady rest apparatus is two, however it may be three or more. In this case, the number of the first steady rest apparatus 52 may be plural, the number of the second steady rest apparatus 53 may be plural, or both of the numbers of the first steady rest apparatus 52 and the second steady rest apparatus 53 may be plural. In the case where the number of the second steady rest apparatus 53 is plural and the spindle chuck 23 is provided, the first steady rest apparatus 52 may be positioned between the tail stock 30 and the second steady rest apparatus positioned nearest to the tail stock 30.

While a number of the steady rest apparatus in the second embodiment of the present invention is two, however it may be three or more. In this case, the number of the first temporary rest apparatus 152 may be plural, the number of the second temporary rest apparatus 153 may be plural, or both of the numbers of the first temporary rest apparatus 152 and the second temporary rest apparatus 153 may be plural.

What is claimed is:

1. A machine tool with a rest apparatus comprising:
   a base;
   a spindle head that rotatably holds a first end of a workpiece, the spindle head mounted on said base;
   a tail stock that rotatably holds a second end of a workpiece, the tail stock mounted on said base so as to face said spindle head;
   a first rest apparatus mounted between said spindle head and said tail stock, and the first rest apparatus fixed to said base un-movably to support said workpiece; and
   a second rest apparatus mounted between said spindle head and said tail stock, the second rest apparatus movably mounted on said base to support said workpiece such that the second rest apparatus is movable in a horizontal direction extending longitudinally between said spindle head and said tail stock.

2. The machine tool with a rest apparatus according to claim 1, wherein said first rest apparatus is mounted at a side of said tail stock from said second rest apparatus.

3. The machine tool with a rest apparatus according to claim 2, wherein said second rest apparatus comprises:
   a rest base fixed to said base,
   a body positioned against said rest base at two places along approaching and departing directions from and to said spindle head and said tail stock, and
   a rest supporter mounted on said body to support said workpiece.

4. The machine tool with a rest apparatus according to claim 3, wherein said spindle head and said tail stock are movable respectively against said base, and
   wherein said spindle head has a chuck holding the first end of said workpiece.

5. The machine tool with a rest apparatus according to claim 4, wherein said rest apparatus is a steady rest apparatus,
   said first rest apparatus is a first steady rest apparatus,
   said second rest apparatus is a second steady rest apparatus, and
   said first and second steady rest apparatuses support said workpiece during machining in cooperation with the workpiece being held by said spindle head and said tail stock.

6. The machine tool with a rest apparatus according to claim 5, wherein said second steady rest apparatus further comprises a stopper in contact with said body to adjust said two places at which the body is positioned along approaching and departing directions from and to said spindle head and said tail stock in accordance with a contacting position with said body.

7. The machine tool with a rest apparatus according to claim 6, wherein said stopper includes
   a first stopper mounted at a side of said spindle head to adjust a first positioned place of said body at a side of said spindle head, and
   a second stopper mounted at the side of said tail stock to adjust said positioned place of said body at a side of said tail stock.

8. The machine tool with a rest apparatus according to claim 5, wherein each of said first and second steady rest apparatuses centers a center of said workpiece in alignment with centers of said spindle head and said tail stock.

9. The machine tool with a rest apparatus according to claim 5, wherein said rest apparatus includes a plurality of said second steady rest apparatuses, and
   wherein said first steady rest apparatus is positioned between said tail stock and one of the plurality of second steady rest apparatuses, which is positioned nearest to said tail stock.

10. A machine tool with a rest apparatus comprising:
    a base;
    a spindle head mounted on said base and having a chuck to hold rotatably a first end of a workpiece, said workpiece being a camshaft having a plurality of ground cams and a plurality of journal portions;
    a tail stock mounted on said base so as to face said spindle head and to hold rotatably the other end of said workpiece;
    said spindle head and said tail stock are movable respectively against said base;
    a first steady rest apparatus mounted between said spindle head and said tail stock and fixed to said base un-movably to support a first journal portion of said workpiece during machining in cooperation with the workpiece being held by said spindle head and said tail stock; and
    a second steady rest apparatus mounted between said spindle head and said tail stock and movably mounted on said base to support a second journal portion of said workpiece during machining in cooperation with the workpiece being held by said spindle head and said tail stock,
    wherein said first steady rest apparatus is mounted at a side of said tail stock from said second rest apparatus, and
    wherein said second steady rest apparatus includes
    a rest base fixed to said base,
    a body positioned against said rest base at two places along approaching and departing directions from and to said spindle head and said tail stock,
    a first stopper mounted at a side of said spindle head to adjust a first positioned place of said body at a side of said spindle head, and
    a second stopper mounted at a side of said tail stock to adjust a second positioned place of said body at a side of said tail stock.

11. The machine tool with a rest apparatus according to claim 4, wherein said rest apparatus is a temporary rest apparatus,
    wherein said first rest apparatus is a first temporary rest apparatus,
    wherein said second rest apparatus is a second temporary rest apparatus, and
    wherein said first and second temporary rest apparatuses support said workpiece temporarily before and after the workpiece is held by said spindle head and said tail stock.

12. The machine tool with a rest apparatus according to claim 11, wherein each of said first temporary rest apparatus and said second temporary rest apparatus comprises:
   a temporary rest body mounted on said base,
   a cylinder having a movable end portion movable to a direction that does not intersect with an axis of said workpiece and is not parallel to said axis of said workpiece,
   a cradle supported on said temporary rest body to be oscillated and connected to said movable end portion of said cylinder to be oscillated, and
   a temporary rest supporting said workpiece temporary and adjusted a distance from a center of said workpiece in accordance with operation of said cylinder.

13. A positioning method of a machine tool with a rest apparatus including a spindle head and a tail stock holding respectively at least two kinds of workpieces selectively, and a first rest apparatus fixed to a base un-movably to support said workpiece, the positioning method comprising the following steps:
   first positioning step positioning a first workpiece of said two kinds of workpieces along an axial direction of said first workpiece in a way that a first supported position of said first workpiece coincides with said first rest apparatus;
   first holding step holding said first workpiece by said spindle head and said tail stock after at least one of said spindle head and said tail stock is adjusted along said axial direction to hold said first workpiece as positioned;
   second positioning step positioning a second workpiece of said two kinds of workpieces along an axial direction of said second workpiece in a way that the first supported position of said second workpiece coincides with said first rest apparatus; and
   second holding step holding said second workpiece by said spindle head and said tail stock after at least one of said spindle head and said tail stock is adjusted to hold said second workpiece as positioned along said axial direction at a different position from a position for said first workpiece.

14. The positioning method of a machine tool with a rest apparatus according to claim 13, wherein the rest apparatus further includes a second rest apparatus movable to said base to support said workpiece, the method further comprising the following steps:
   first rest supporting step supporting said first workpiece of said two kinds of workpieces by said second rest apparatus after said second rest apparatus is adjusted along said axial direction to support a second supported position of said first workpiece; and
   second rest supporting step supporting said second workpiece of said two kinds of workpieces by said second rest apparatus after said second rest apparatus is adjusted to a different position from a position for said first workpiece along said axial direction to support a second supported position of said second workpiece.

* * * * *